(12) United States Patent
Haenel et al.

(10) Patent No.: US 10,300,881 B2
(45) Date of Patent: May 28, 2019

(54) SIDE AIRBAG FOR VEHICLES

(71) Applicant: Ford Global Technologies, LLC, Dearborn, MI (US)

(72) Inventors: Felix Haenel, Cologne (DE); Christopher Curtis, Leverkusen (DE)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 91 days.

(21) Appl. No.: 15/420,144

(22) Filed: Jan. 31, 2017

(65) Prior Publication Data

US 2017/0136983 A1 May 18, 2017

Related U.S. Application Data

(63) Continuation of application No. 14/717,868, filed on May 20, 2015, now Pat. No. 9,598,045.

(30) Foreign Application Priority Data

May 21, 2014 (DE) .................. 10 2014 209 644

(51) Int. Cl.
*B60R 21/239* (2006.01)
*B60R 21/231* (2011.01)
(Continued)

(52) U.S. Cl.
CPC .......... *B60R 21/239* (2013.01); *B60R 21/207* (2013.01); *B60R 21/233* (2013.01);
(Continued)

(58) Field of Classification Search
CPC ... B60R 21/239; B60R 21/276; B60R 21/207; B60R 21/264; B60R 21/2346;
(Continued)

(56) References Cited

U.S. PATENT DOCUMENTS 5,380,038 A * 1/1995 Hawthorn ............. B60R 21/233
280/730.1
5,722,685 A * 3/1998 Eyrainer ........... B60R 21/23138
280/729

(Continued)

FOREIGN PATENT DOCUMENTS

DE 102009031615 A1 1/2011
EP 1832475 A1 9/2007

*Primary Examiner* — Paul N Dickson
*Assistant Examiner* — Timothy Wilhelm
(74) *Attorney, Agent, or Firm* — Frank A. MacKenzie; Bejin Bieneman PLC

(57) ABSTRACT

A side airbag for protection for vehicle occupants includes an interior wall separating the airbag into upstream and downstream chambers and defining an opening between two chambers adjacent a lower end of the airbag. A flow deflector between the opening and an exterior vent combines with the wall to define a channel therebetween. The channel directs inflation gasses exiting the opening into an upper end of the airbag, after which the gasses must flow around an upper end of the deflector (adjacent an outlet end of the channel) before reaching the exterior vent. The resulting S-shaped flow path serves to maintain the airbag in the inflated state for a longer time and urges an outboard arm of an occupant in a forward an upward direction to reduce the likelihood that that arm may be trapped between the inflating airbag and the occupant's thorax.

20 Claims, 7 Drawing Sheets

(51) Int. Cl.
*B60R 21/233* (2006.01)
*B60R 21/26* (2011.01)
*B60R 21/2346* (2011.01)
*B60R 21/207* (2006.01)
*B60R 21/264* (2006.01)
*B60R 21/276* (2006.01)
*B60R 21/00* (2006.01)

(52) U.S. Cl.
CPC .... B60R 21/2346 (2013.01); B60R 21/23138 (2013.01); B60R 21/264 (2013.01); B60R 21/26005 (2013.01); B60R 21/276 (2013.01); B60R 2021/0006 (2013.01); B60R 2021/0041 (2013.01); B60R 2021/0055 (2013.01); B60R 2021/2395 (2013.01); B60R 2021/23146 (2013.01)

(58) Field of Classification Search
CPC ............ B60R 21/26005; B60R 21/233; B60R 21/23138; B60R 2021/0006; B60R 2021/0055; B60R 2021/0041; B60R 2021/2395; B60R 2021/23146
See application file for complete search history.

(56) References Cited

U.S. PATENT DOCUMENTS

| | | | | |
|---|---|---|---|---|
| 6,302,431 B1* | 10/2001 | Sasaki | B60R 21/207 | 280/728.2 |
| 6,561,539 B1* | 5/2003 | Sunabashiri | B60R 21/23138 | 280/729 |
| 6,997,473 B2* | 2/2006 | Tanase | B60R 21/207 | 280/730.2 |
| 7,192,050 B2* | 3/2007 | Sato | B60R 21/23138 | 280/729 |
| 7,347,445 B2* | 3/2008 | Choi | B60R 21/233 | 280/729 |
| 7,384,062 B2* | 6/2008 | Yokoyama | B60R 21/23138 | 280/730.2 |
| 7,431,329 B2* | 10/2008 | Taguchi | B60R 21/23138 | 280/729 |
| 7,607,682 B2* | 10/2009 | Kurimoto | B60R 21/23138 | 280/729 |
| 7,637,530 B2* | 12/2009 | Yamaji | B60R 21/23138 | 280/730.2 |
| 7,766,379 B2* | 8/2010 | Dix | B60R 21/23138 | 280/730.1 |
| 7,793,973 B2* | 9/2010 | Sato | B60R 21/235 | 280/729 |
| 7,862,077 B2* | 1/2011 | Yokota | B60R 21/23138 | 280/729 |
| 7,938,440 B2* | 5/2011 | Kataoka | B60R 21/207 | 280/729 |
| 8,011,691 B2* | 9/2011 | Urushibata | B60R 21/233 | 280/730.1 |
| 8,480,124 B2* | 7/2013 | Rickenbach | B60R 21/207 | 280/730.2 |
| 8,485,550 B2* | 7/2013 | Kino | B60R 21/207 | 280/730.2 |
| 8,528,934 B2* | 9/2013 | Kobayshi | B60R 21/207 | 280/729 |
| 8,550,495 B2* | 10/2013 | Sato | B60R 21/231 | 280/730.2 |
| 8,562,015 B2* | 10/2013 | Yamamoto | B60R 21/231 | 280/729 |
| 8,567,817 B2* | 10/2013 | Yamamoto | B60R 21/23138 | 280/729 |
| 8,608,198 B2* | 12/2013 | Shibayama | B60R 21/233 | 280/729 |
| 8,662,529 B2* | 3/2014 | Yamamoto | B60R 21/23138 | 280/730.2 |
| 8,757,657 B1* | 6/2014 | Hotta | B60R 21/233 | 280/730.2 |
| 8,801,029 B2* | 8/2014 | Hotta | B60R 21/231 | 280/729 |
| 8,915,519 B2* | 12/2014 | Hotta | B60R 21/2346 | 280/729 |
| 9,096,192 B2* | 8/2015 | Koike | B60R 21/233 | |
| 9,150,185 B2* | 10/2015 | Hotta | B60R 21/23138 | |
| 2006/0038386 A1* | 2/2006 | Shibayama | B60R 21/23138 | 280/730.2 |
| 2007/0267854 A1 | 11/2007 | Fukuda et al. | | |
| 2008/0023943 A1* | 1/2008 | Kwon | B60R 21/233 | 280/728.2 |
| 2009/0115176 A1* | 5/2009 | Reiter | B60R 21/231 | 280/743.2 |
| 2009/0212539 A1* | 8/2009 | Honda | B60R 21/2171 | 280/729 |
| 2010/0032929 A1* | 2/2010 | Razazi | B60R 21/201 | 280/730.2 |
| 2010/0181749 A1* | 7/2010 | Sugimoto | B60R 21/2171 | 280/743.2 |
| 2012/0025497 A1* | 2/2012 | Yoo | B60R 21/233 | 280/729 |
| 2012/0043741 A1* | 2/2012 | Yamamoto | B60R 21/23138 | 280/730.2 |
| 2012/0126518 A1* | 5/2012 | Fukawatase | B60R 21/207 | 280/730.2 |

* cited by examiner

SIDE AIRBAG FOR VEHICLES

CROSS-REFERENCE TO RELATED APPLICATIONS

This application is a continuation of and claims priority to and all advantages of U.S. patent application Ser. No. 14/717,868 filed on May 20, 2015, which claims foreign priority benefits under 35 U.S.C. § 119(a)-(d) to German Patent Application No. DE 10 2014 209 644.2 filed May 21, 2014, both of which are hereby incorporated by reference in their entireties.

TECHNICAL FIELD

The invention relates to a side airbag for vehicles.

BACKGROUND

For optimum benefit to occupant safety, side airbags used in vehicles should deploy very rapidly. Arranged in a sealed bag, for example in the backrest of the seat assigned thereto, side airbags must emerge from the stowed position within a few milliseconds of a side impact and inflate between the seat/occupant and bodywork side on which the side impact takes place. For producing the gas, therefore, a gas generator or inflator is provided which produces the gas which inflates the airbag, wherein the inflator is generally arranged inside the airbag. So that during the side impact the airbag is rapidly emptied, a vent is configured as a simple opening. Here there is the possibility that the emptying may take place too rapidly, i.e. that the gas does not remain sufficiently long in the airbag, so as to retain the internal pressure.

SUMMARY

Disclosed embodiments provide a side occupant protection airbag in which the inflation pressure built up by the gas may be retained longer and the gas may still be discharged freely out of the airbag. A deflector is provided for the deflection and delayed discharge of the gas from the airbag, said deflector blocking the flow of inflation gas to the airbag's exterior vent.

The deflector, therefore, causes the flow of inflation gas to be forcibly conducted around or past the vent. The gas flow is deflected or diverted by the deflector. The deflector may be designed and arranged so that the gas flow is initially guided past and preferably away from the vent before being allowed to reach the vent. A delay in the gas flow may be achieved by creating a back-pressure, whereby the internal pressure is maintained longer upstream of the deflector, and a delayed discharge of the gas may therefore be achieved.

In an embodiment of a side airbag disclosed herein, the airbag comprises a wall separating the airbag into upstream and downstream chambers and defining an opening between the two chambers adjacent a lower end of the airbag, the term "lower" being relative to an operating position within a vehicle. A deflector is located between a downstream side of the opening and an exterior vent, the deflector and a downstream surface of the wall defining a channel therebetween. The channel directs inflation gasses exiting the opening toward and into an upper end of the airbag, after which the gasses must flow around an upper end of the deflector (adjacent an outlet end of the channel) before reaching the exterior vent. The resulting S-shaped flow path through the airbag during inflation serves to maintain the airbag in the inflated state for a longer time. Also, the resulting inflation pattern urges an outboard arm of an occupant in a forward an upward direction to reduce the likelihood that that arm may be trapped between the inflating airbag and the occupant's thorax.

According to another disclosed embodiment, the side airbag further comprises a second wall extending from the wall toward the deflector at an angle to create the decreasing cross-sectional area.

According to another disclosed embodiment, an upstream portion of the channel formed by the wall and the deflector has a decreasing cross-sectional area in a direction of flow, and a downstream portion of the channel has an increasing cross-sectional area in the direction of flow. This may achieved by an arrangement wherein the deflector comprises an upstream portion oriented at a first angle to the wall to create the decreasing cross-sectional area, and a downstream portion oriented at a second angle to the wall to create the increasing cross-sectional area.

In a further embodiment of the side airbag, the deflector may adjoin the airbag at the edge in a flow-tight manner, upstream in the flow direction, and may be arranged so as to extend away with a directional component in the flow direction. This may take place in a specific connecting region on the airbag. In this manner, the access or passage of gas to the vent is only possible downstream of the deflector. The entire flow of the gas coming into contact with the deflector may be conducted along the deflector past or away from the vent. Thus the gas has to flow to the vent in a labyrinthine manner via diversions, whereby the flow velocity is throttled and a corresponding back-pressure is produced, which holds the gas pressure in the airbag longer without the gas subsequently being hindered from flowing out through the vent.

Preferably, the deflector extends at a first angle of less than 90°, preferably less than 60° from the edge of the airbag, away from said airbag into the interior of the airbag. The connecting region may be arranged downstream of the first chamber in the flow direction, adjacent thereto and/or spaced apart from the deflector.

In an embodiment of the side airbag, it may be provided that the gas generated by the inflator in the first chamber is first guided into a lower region of the airbag relative to a designated operating position of the side airbag. In the operating position in which the airbag is deployed, this lower region may be arranged at a height below an armrest provided on the vehicle and/or may extend as far as said armrest.

The opening through which inflation gasses flow from the first or upstream chamber into the second or downstream chamber may be arranged in the lower region of the airbag, preferably in the vicinity of the bottom end of the airbag. As a result of this arrangement of the first chamber and the opening, right at the start of the inflation of the airbag the first chamber and thus the airbag is forced out of the above-described chamber or housing on the backrest or on the side bodywork so that the airbag is arranged between the occupant and the bodywork. The first chamber substantially serves to force the airbag out of a housing provided in the seat, wherein generally to this end in the operating position of the airbag a fabric covering the housing preferably has to be torn on a seam edge, usually from top to bottom. The pressure of the gas in the airbag is at the greatest in the first (upstream) chamber. A drop in pressure may take place at the opening, whereby the downstream chamber has a lower internal pressure than the first chamber.

A reversal of the direction of gas flow may take place from bottom to top in the vicinity of or on the bottom of the airbag. This may take place in a transition region between the first (upstream) chamber and the second (downstream) chamber, in a first flow reversal, in this case from bottom to top. It may take place in the first chamber or immediately downstream of the opening in the flow direction.

As a result of the disclosed arrangement of the opening in the lower region of the airbag, preferably in the vicinity of the bottom end of the airbag, the downstream chamber may be filled starting at the bottom and progressing to the top. This may have the effect, amongst other things, that the arm of an occupant is accelerated or urged obliquely upwards and forward (relative to the vehicle) in the case of a side impact, as the downstream chamber is filled. Thus it is possible to counteract the risk of the occupant's outboard arm being trapped between the airbag and the thorax of the occupant, and being pressed against the thorax at the side with the possible result of injury.

The opening may be arranged in the operating position below an armrest provided for the occupant. Preferably, the opening is arranged in the part of the lower region of the airbag, which in the operating position is assigned above the pelvic region or in the pelvic region of an occupant. This has the advantage that in the event of a side impact the position of the pelvis may be laterally stabilized and protected.

The opening may be configured as a channel. It may extend over a specific flow region. The opening may have cross-sectional areas in the flow region which change in the flow direction. The opening may be configured, for example, in the manner of a nozzle. At least in one upstream portion of the flow region in the flow direction, it may have a tapering, preferably conical or wedge-like shape in the flow direction relative to its cross section. The opening may, therefore, be configured to be converging, wherein its cross section is configured to reduce continuously.

In a further development of the side airbag, it may be provided that the first chamber is separated from the downstream chamber by an inner wall in the airbag. Preferably, the first chamber is configured to widen in the flow direction. This assists rapid filling of the first chamber with the gas.

The inner wall, the deflector, and the further inner walls described below may be configured in each case as an intermediate wall inserted between the inboard panel and outboard panel, said intermediate wall being connected in an at least substantially gas-tight manner to the inboard panel and outboard panel. To this end, toward the inboard panel and outboard panel in each case the respective wall may have a fold which is arranged so as to bear flat against the assigned panel and is connected to this panel preferably by a stitched and/or bonded connection.

In an embodiment, the deflector or the deflector in combination with the inner wall may define the channel for guidance of the gas, by altering the direction and/or creating back-pressure of the flow of the gas. Thus the gas may be passed forcibly through the channel. The inner wall may adjoin the airbag at the edge in an at least substantially gas-tight manner. By defining the channel by the wall and the deflector, the flow may be forcibly and entirely passed through the channel.

In an embodiment, the channel may have an upstream portion (relative to the flow direction), in which the channel has a converging cross section. Moreover, the channel may have a downstream portion in which the flow direction of the gas is deflected in a vertical direction in the operating position of the side airbag. Thus the flow of the gas in the upstream portion may be collected and compressed and also diverted in the downstream portion. The downstream portion may merge directly with the upstream portion. The collection and diversion of the flow may take place together in a portion of the channel.

Preferably, the channel may be configured on the outlet side and/or in the downstream portion with a diverging cross section. "Diverging" means that the cross-sectional area of the channel increases along the flow direction. Thus the channel may be configured in a similar manner to a convergent-divergent nozzle. In this case, an increased back-pressure may be achieved in the upstream portion of the channel and a greater flow velocity may be achieved in the downstream portion, wherein the level of back-pressure and flow velocity depends amongst other things on the geometries of the channel. Moreover, as a result of the alteration to the volume in the transition from the upstream portion to the downstream portion, an entropy increase of the gas may be potentially associated with an advantageous temperature reduction of the gas.

In an embodiment, the upstream portion may be arranged at least to a large extent below an arm region of the airbag provided for the armrest. The arm region may be designed for lateral protection of an occupant, approximately level with an armrest provided on the vehicle. Thus in the case of a side impact, the acceleration of the arm of the occupant upwardly in the direction of travel may be increased.

In an embodiment, the vent may be arranged in a central region of the airbag in the operating position. The vent may be arranged at a height of the airbag which in the operating position is arranged below a first level in which an upper arm of an average occupant is positioned, and above a second level in which an armrest is provided for the lower arm of the occupant. In particular, it may be provided that the vent is positioned in the arm region.

In particular, the deflector may delimit a third chamber, comprising the vent, from the downstream chamber. In the third chamber, the internal pressure may be further reduced relative to the downstream chamber. The deflector may at the same time define the channel. The deflector may block the vent relative to the direction of the opening to the vent. Thus a second flow reversal in the airbag may take place, as a result of which the flow oriented upwardly in the operating position is deflected downwardly into the third chamber, wherein this forms the access to the vent. Preferably, the second flow reversal takes place in an upper (when in the operating position) region of the airbag.

As a result of the sequence of two flow reversals, the flow path in the airbag may be generally of Z-shaped or S-shaped configuration. In this case, the flow direction of the gas in the first chamber may be oriented in at least approximately the same manner to that in the downstream chamber, whilst the flow direction of the gas in the downstream chamber is at least approximately opposite that of the first chamber. The serpentine path of the flow is further configured thereby. The internal pressure of the gas is further reduced. The gas is forced to remain for a longer time in the airbag without the size of the vent having to be reduced.

In particular, the deflector may define the channel on a side of the inner wall opposite from the upstream chamber. In an embodiment of the side airbag, the deflector in the upstream portion of the channel may face counter to the direction of gas flow in the channel, and in the downstream portion of the channel may face in the direction of gas flow in the channel. Thus the deflector may have two arms enclosing a second angle, the ends of the arms thereof in each case facing with a directional component away from the inner wall and/or toward the vent. Thus the vent may be shielded more effectively. The second angle may have a value of less than/equal to 150°, less than/equal to 120° or less than/equal to 100°.

In an embodiment of the side airbag, a second inner wall is provided approximately level with a downstream portion of the deflector, said second inner extending from the inner wall with a directional component in the flow direction and defining the channel on a side facing the first chamber. The channel may be defined downstream in the flow direction by the second inner wall. The second inner wall defines the channel, preferably in the downstream portion thereof. The second inner wall faces in the downstream portion of the channel counter to the flow direction of the gas in the channel. Thus the second inner wall may serve as a guide surface for diverting the gas, primarily at least approximately in the vertical direction in the operating position.

The channel may have an inlet opening and an outlet opening relative to the flow direction. The opening cross section of the inlet opening may be larger than or the same as the opening cross section of the outlet opening.

The present invention is described in more detail hereinafter with reference to a plurality of embodiments of the blade container shown in the drawings, wherein all views are schematic.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
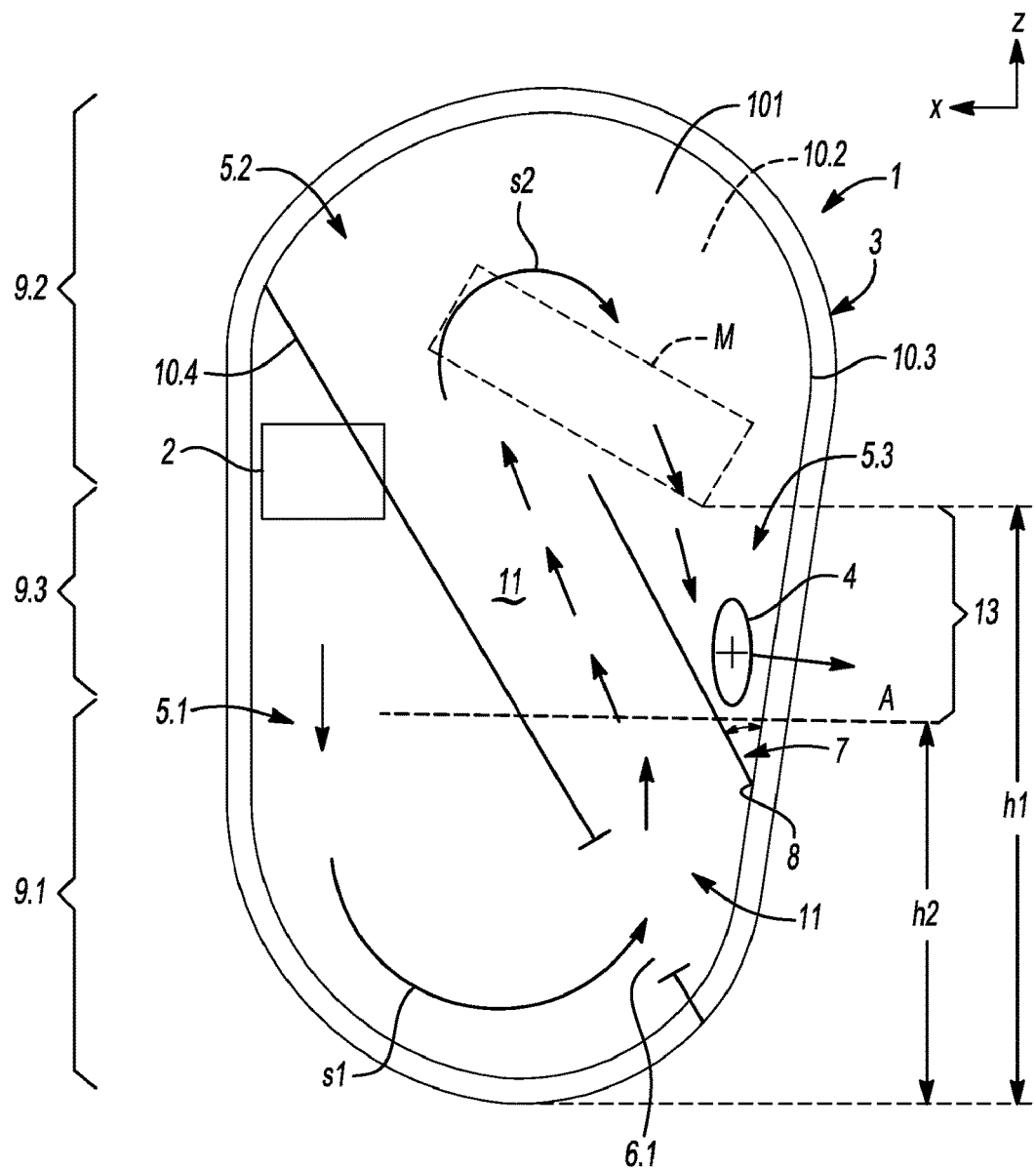
FIG. 1 shows a side view of a first embodiment of a side airbag.

FIG. 1 shows a first embodiment of a side airbag assembly 1 for vehicles comprising an airbag 3 which filled with gas by means of an inflator 2. The inflation gas is guided in a flow direction from the inflator 2, through the airbag 3, and to an exterior vent 4 where it is vented out of the airbag 3.

The airbag 3 comprises an inboard panel 10.1 (visible in FIGS. 1-6) and an outboard panel 10.2 (which is congruent with the inboard panel 10.1 as viewed in the drawings and therefore hidden from view on the opposite side of the inboard panel 10.1 in FIGS. 1-6), wherein the two panels 10.1, 10.2 are connected together around their common circumference in a gas-tight manner by seams 10.3 (in a manner well known in the art).

The terms "inboard" and "outboard" used herein refer to directions relative to the vehicle in which the airbag system 1 is installed. When inflated, the airbag 3 is (as is well known in the art) positioned between a vehicle occupant and an interior portion of the vehicle (side wall or door, for example), with the inboard airbag panel facing or adjacent to the occupant and the outboard airbag panel facing or adjacent to the side wall or door. The vent 4 may advantageously be formed in the inboard panel 10.1.

In the figures, the airbag 3 is shown substantially completely filled with inflation gas. The direction of gas flow is altered during the passage of the gas through the airbag 3. The airbag 3 has a first chamber 5.1 (the lower left portion of the airbag as viewed in the figures) and a second chamber 5.2 (the upper right portion as viewed in the figures), an inner wall 10.4 separating the chambers. The first chamber 5.1 is in fluid communication with the second chamber 5.2 via a opening 6.1 defined by the inner wall 10 and adjacent a lower airbag end. The second chamber 5.2 is arranged downstream (relative to the flow direction of gas during inflation of the airbag) from the first chamber 5.1, so that the first and second chambers are hereinafter appropriately referred to as the upstream and downstream chambers respectively.

A deflector 7 is provided to deflect the flow of gas in the inflating airbag 3 initially away from the vent 4 and to thereby delay discharge of the gas from the airbag 3. The deflector 7 extends between the vent 4 and the first gas opening 6.1 so that gasses exiting the opening 6.1 are blocked from flowing along a straight-line path to reach the vent 4. The deflector 7 extends at a first angle $\beta1$, in the illustrated embodiment less than 60°, away from the edge of the airbag 3 to the inside.

The alignment of the airbag 3 in the figures corresponds generally to that of its operating position (after deployment from its storage position in a housing, typically in the backrest of the associated seat) in the vehicle and as viewed laterally from inside the passenger compartment (not shown). The vertical position or height of an approximately horizontal armrest provided in the vehicle outboard of the associated seat is indicated symbolically by means of a dashed line A; moreover the x-direction and z-direction of the vehicle are indicated.

The deflector 7 is attached to the edge of the airbag 3 in a flow-tight manner, at a connecting region 8 of the airbag 3, and extends therefrom downstream in the flow direction. It extends with a directional component in the flow direction away from the connecting region 8. The connecting region 8 is arranged downstream from the upstream chamber 5.1 (FIGS. 1, 2), adjacent thereto (FIGS. 3-5) and/or spaced apart from the wall 10.4 (FIG. 1, 2).

The gas generated by the inflator 2 is first guided generally downwardly (relative to a designated operating position of the side airbag) within the upstream chamber 5.1. The upstream chamber 5.1 is configured to widen downwardly. The opening 6.1 is arranged (when the airbag assembly 1 is in the operating position) in a lower region 9.1 of the airbag so as to be below the armrest level A. The lower region 9.1 with the opening 6.1 in the operating position is approximately level with a pelvic region Be of an occupant. (This may be seen in FIG. 4, which shows a substantially abstracted side view of the embodiment of the side airbag 1 according to FIG. 3 with a purely schematically shown Dummy D for an average adult occupant in a seated position adjacent to the side airbag 1). Thus in the case of a side impact the airbag is rapidly filled with gas by the inflator 2, the inflation initially progressing from top to bottom into the upstream chamber 5.1. The side airbag assembly 1 is, as is well known in the art, arranged in a storage position (not shown), in a housing of the backrest of an associated seat and is covered by fabric. With the rapid filling of the upstream chamber 5.1, the airbag 3 expands forward out of the housing, tearing the fabric, and displaced between the occupant and the vehicle bodywork.

The flow of the gas exits the opening 6.1 into the downstream chamber 5.2 from below. The flow within the upstream chamber 5.1 was in downward direction, and subsequently the flow direction in the downstream chamber 5.2 is in an upward direction, so that a first flow reversal (indicated by counter-clockwise curved arrow s1) takes place, in which the gas is deflected or redirected upwardly with a component in the z-direction, simultaneously creating a back-pressure. Thus the filling of the downstream chamber takes place from bottom to top. The opening 6.1 is arranged (when the airbag 3 is installed in a vehicle in its operating position) below the armrest level A and approximately in the region of the hips H of the dummy D (see FIG. 4). Thus the arm M of the dummy D, when the downstream chamber is filled, is pivoted upwardly approximately in the xz-plane (image plane) and thus away from the chest/abdominal region B of the dummy D so as not to be trapped at the side against the chest/abdominal region B (FIG. 4) causing injury. In the downstream chamber 5.2, the pressure is already lower than in the upstream chamber.

The deflector 7 and a downstream surface of the wall 10.4 define therebetween a channel 11 for forced guidance of the gas by altering the direction and/or creating back-pressure of the flow of the gas. As the deflector 7 is connected in a gas-tight manner to the inboard panel 10.1 and outboard panel 10.2, as is also able to be derived directly from the figures, the gas is forcibly guided in its entirety through the channel 11.

In the embodiment shown in FIG. 1, the deflector 7 is oriented approximately parallel to the wall 10.4. A third chamber 5.3 is defined between the deflector 7 and the adjacent inner surface of the airbag 3 in the immediate vicinity of vent 4, the vent 4 receiving inflation gas directly from the third chamber 5.3. The deflector 7 deflects or blocks the flow of gas exiting the opening 6.1 away from the vent 4 and instead into an upper region 9.2 of the airbag 3. Upon reaching the upper region 9.2, the gasses undergo a second flow reversal (indicated by clockwise curved arrow s2) in a direction from the top toward the bottom of the airbag 3 and towards the third chamber 5.3 and the vent 4. As a result, a serpentine, generally S- or Z-shaped flow path of the gas results here, with a continuous pressure drop through the airbag 3. The third chamber 5.2 tapers or narrows in the flow direction (downwardly) so that in this case a further back-pressure is created by reducing a dynamic pressure in the gas. Thus in the third chamber 5.3, the flow of the gas is decelerated so that the emptying of the airbag 3 is advantageously delayed but is still able to take place fully.

Figure 2:
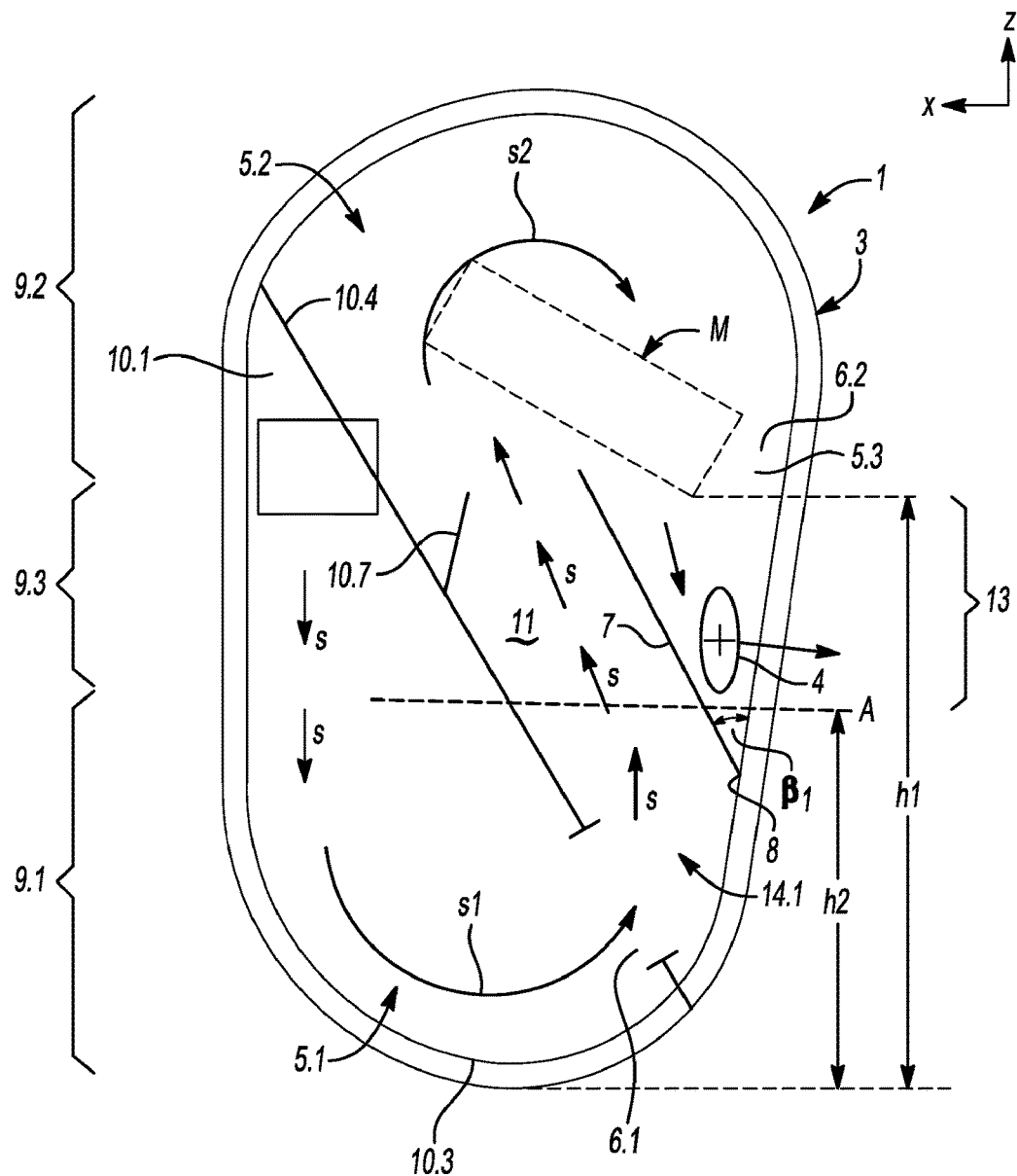
FIG. 2 shows a side view of a second embodiment of a side airbag.

In the embodiment shown in FIG. 2, the channel 11 is further defined by a second inner wall 10.7 which extends from the wall 10.4 at a position proximate an upper end of the deflector 7. The second wall 10.7 extends away from the wall 10.4 and with a directional component in the flow direction, and defines the channel 11 on a side facing the upstream chamber 5.1. It serves as a guide surface for deflecting the gas, primarily at least approximately in the vertical direction in the operating position, i.e. in the z-direction in the vehicle. Additionally, the angled orientation of the second wall 10.7 relative to the channel 11 results in the channel 11 tapering to a smaller cross-sectional area in the flow direction, in the general manner of a converging nozzle. As described above relative to the third chamber 5.3, this converging geometry results in a compression of the gas and thus a deceleration of the flow associated with a pressure reduction in the downstream chamber 5.2.

As indicated in FIG. 2, the vent 4 in the embodiments of the side airbag 1, shown here, is arranged in an optimized position in an arm region 13 in the central region 9.3 of the airbag 3, wherein the arm region 13 is positioned in the operating position below a first level h1 in which an upper arm M (generally and schematically indicated by dashed lines) of an average occupant is positioned, and is arranged above a second level h2 in which the armrest A is provided for the arm M, i.e. below the arm M of the dummy D and above the armrest A of the vehicle.

Figure 3:
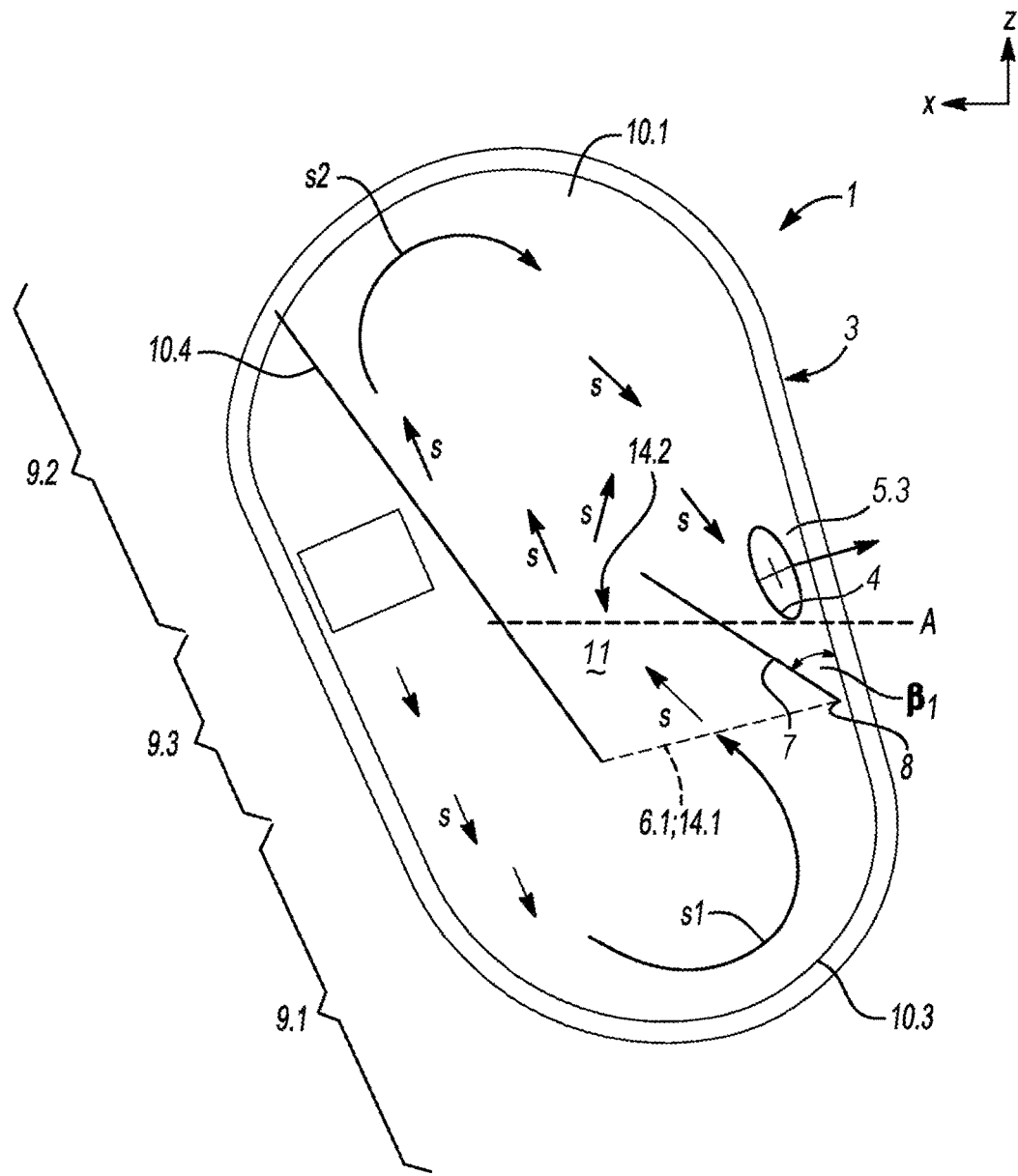
FIG. 3 shows a side view of a third embodiment of a side airbag.
Figure 4:
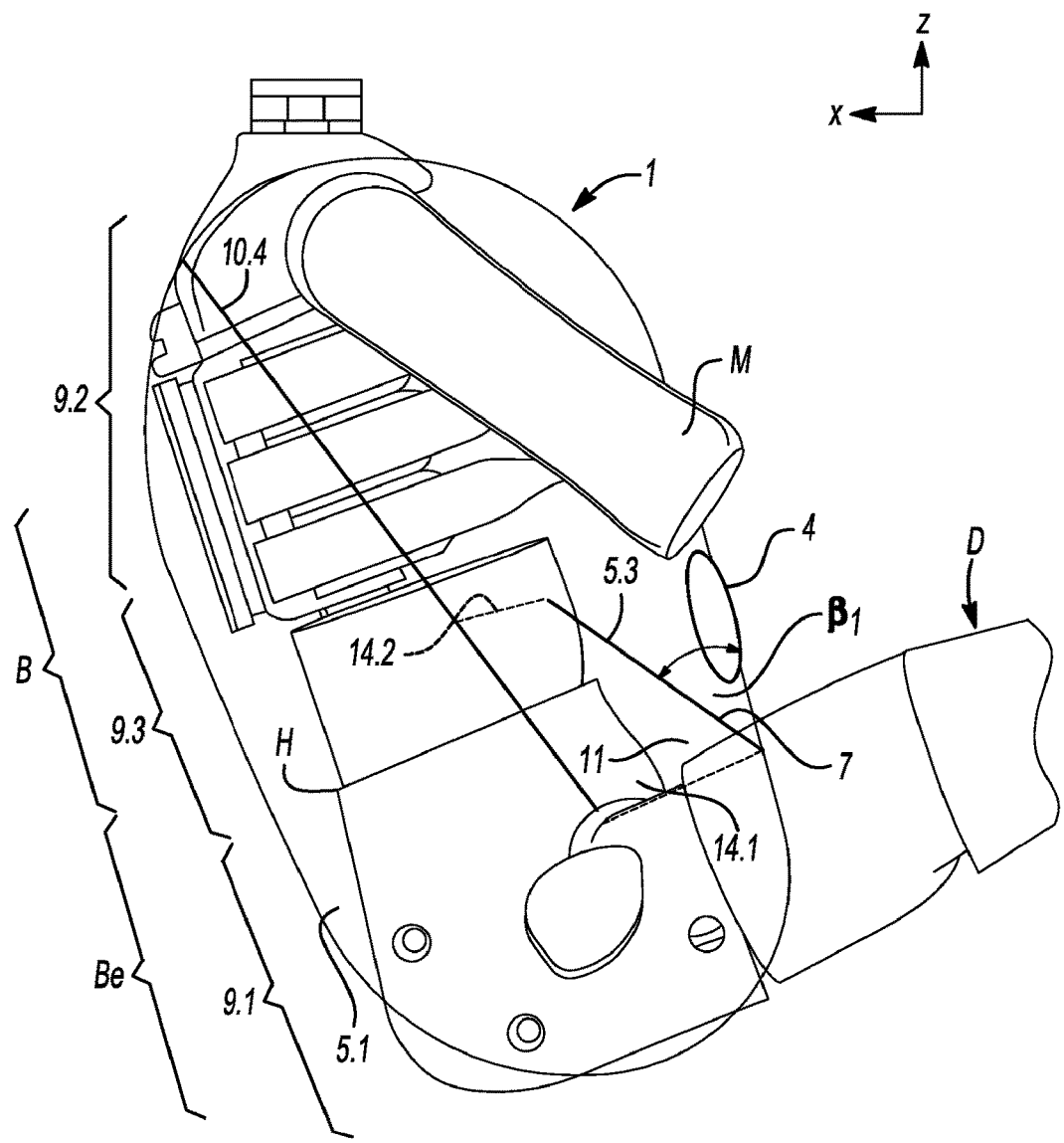
FIG. 4 shows a highly abstracted side view of the third embodiment of the side airbag of FIG. 3 with a dummy representing an average adult in a seated position adjacent to the side airbag.

In the embodiment shown in FIG. 3, in contrast with the embodiments shown in FIGS. 1 and 2, a lower end of the wall 10.4 terminates above the lowermost end of the airbag 3. In this embodiment, the opening 6.1 may be defined by the area between the lower end of the wall 10.4 and the lower end of the deflector 7. The opening 6.1 may also be termed an inlet end 14.1 of the channel 11. Likewise, the space or area between the upper end of the deflector 7 and the first wall 10.4 may be termed an outlet end 14.2 of the channel 11.

Also in the FIG. 3 embodiment, deflector 7 is angled obliquely relative to (is non-parallel with) the wall 10.4 with the result that the channel 11 tapers to a smaller cross-sectional area in the flow direction, in the general manner of a converging nozzle. It may also be seen that the angle β1 between the deflector 7 and adjacent edge of the airbag 3 is larger in comparison with the embodiments according to FIGS. 1 and 2. The third chamber 5.3 is therefore more sharply angled or tapered in the flow direction so that the gas in the third chamber 5.3 is correspondingly more compressed. This causes a further delay in the discharge of the gas through the vent 4.

Figure 5:
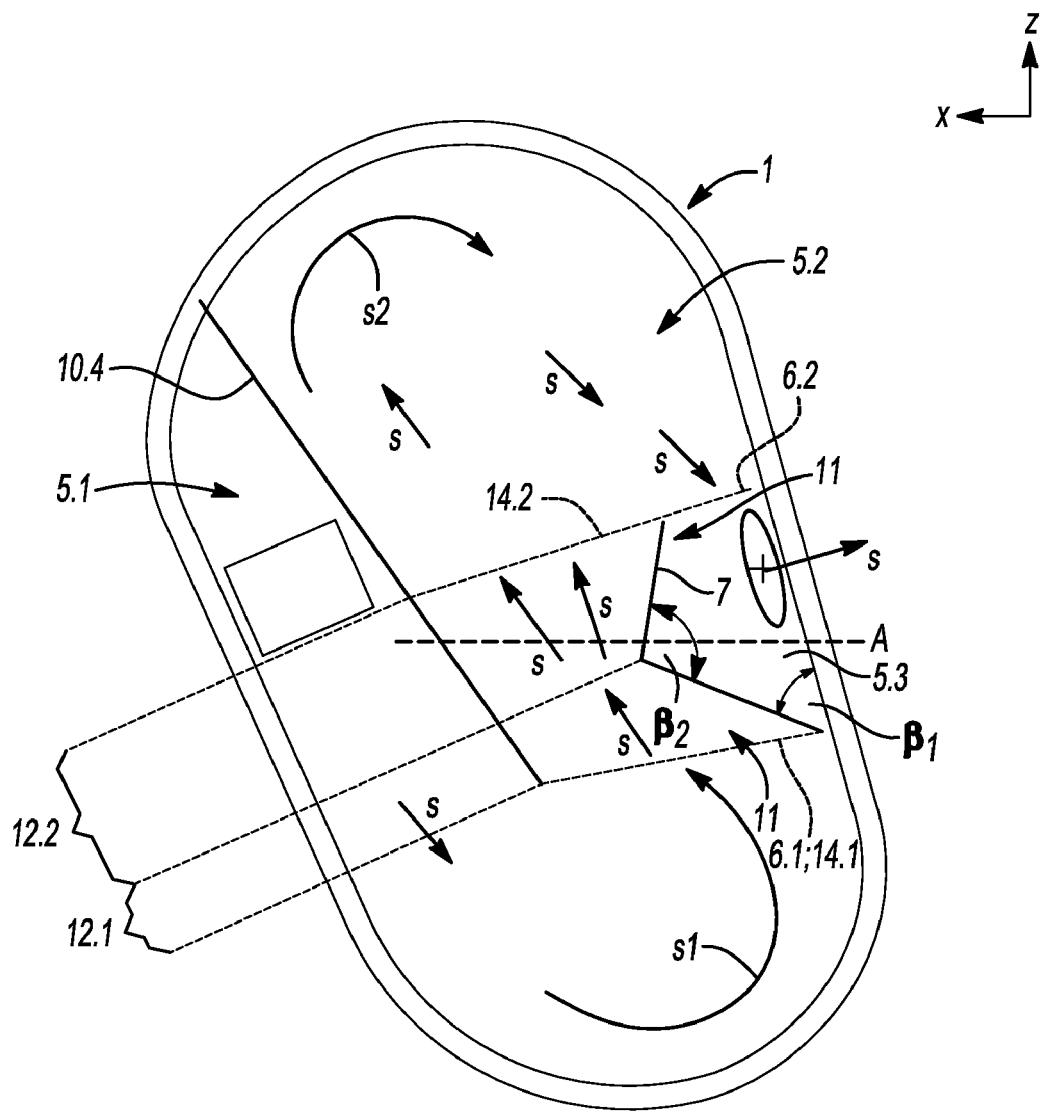
FIG. 5 shows a side view of a fourth embodiment of the side airbag.

In the embodiment of FIG. 5, the channel 11 comprises an upstream portion 12.1 in which the cross section converges in the flow direction, and a downstream portion 12 in which the cross section diverges in the flow direction. The deflector 7 faces on the inside of the guide channel 11 in the upstream portion 12.1 counter to the flow direction of the gas in the guide channel 11 and in the downstream portion 12.2 of the guide channel 11 in the flow direction of the gas in the guide channel 11. Thus the flow of the gas in the upstream portion 12.2 is compressed and in the downstream portion 12.1 is accelerated and deflected in the vertical direction in the operating position of the side airbag. The two portions 12.1, 12.2 enclose a second angle β2 of approximately 100° in the depicted embodiment. Moreover, in the operating position the upstream portion 12.1 is preferably arranged below the armrest level A.

Figure 6:
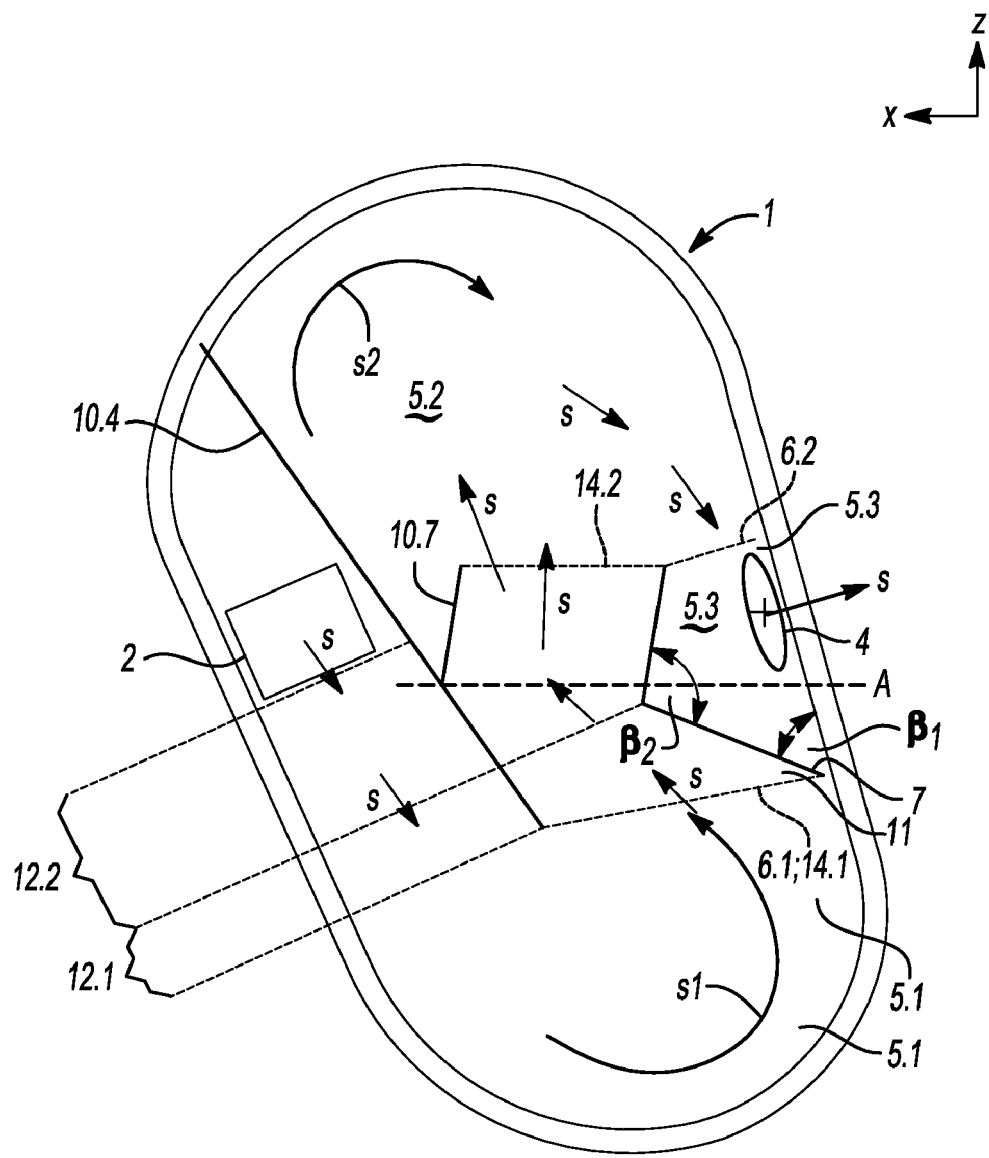
FIG. 6 shows a side view of a fifth embodiment of the side airbag.

According to FIG. 6, similar to as shown in FIG. 2, a second inner wall 10.7 is provided in the side airbag 1, said second wall extending from the wall 10.4 and arranged here approximately level with the downstream portion 12.2 of the deflector 7, whereby as indicated in FIG. 6 by arrows s the gas is deflected vertically (when the airbag is in the operating position within a vehicle), i.e. in the z-direction of the vehicle and thus the airbag 3 may be optimally filled.

As is apparent in FIG. 6, the guide channel 11 has an inlet end 14.1 and an outlet end 14.2 relative to the flow direction, wherein the cross-sectional area of the inlet end 14.1 is larger than or equal to the cross-sectional area of the outlet end 14.2.

Figure 7:
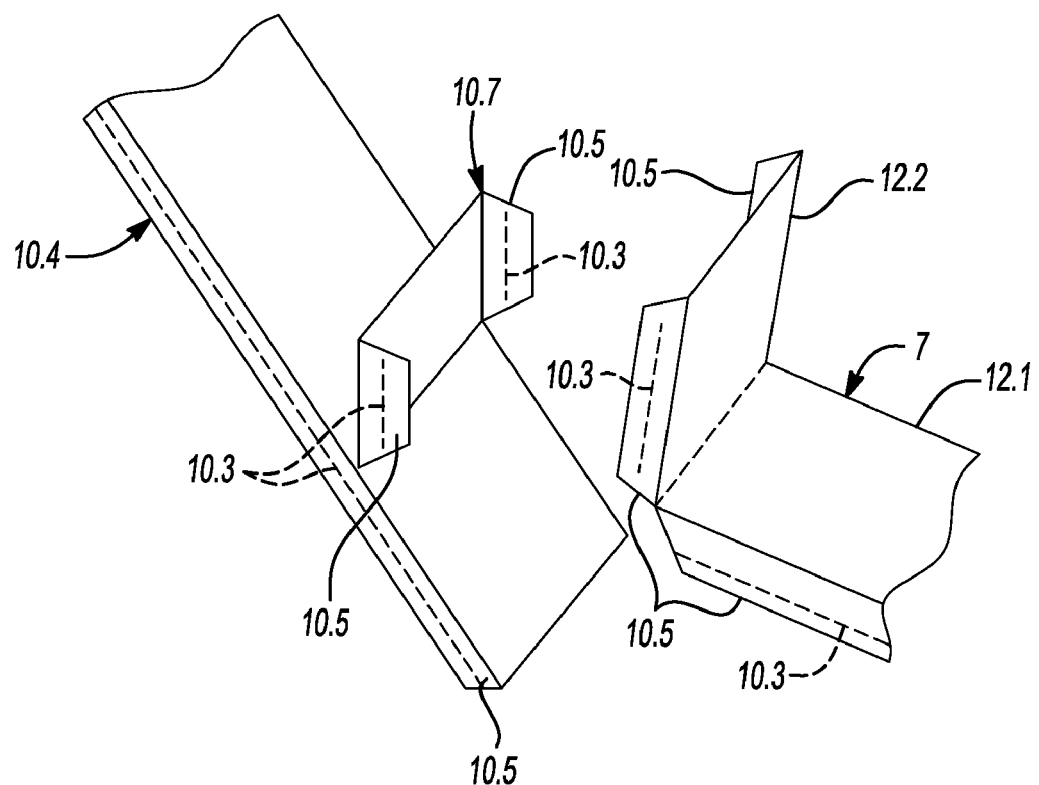
FIG. 7 shows a perspective side view of the inner walls of the fifth embodiment of the side airbag according to FIG. 6.

In FIG. 7 a detail is shown of the wall 10.4 and an embodiment of the deflector 7 according to FIG. 6 in relative positions to one another, but separated from the inboard and outboard panels of the airbag 3. Folds 10.5 are formed along opposite edges of the wall 10.4 and the deflector 7, and the folds are secured to the inboard panel and the outboard panel in a gas-tight manner by stitches 10.3 or other known means of fastening.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A side airbag comprising:
    a wall defining upstream and downstream chambers and an opening therebetween; and
    a deflector between an exterior vent and the wall, the deflector defining a channel between the opening and the exterior vent;
    the wall and the deflector cooperatively defining an S-shaped gas flow path flowing downwardly in the upstream chamber to the opening, upwardly from the opening through the channel, and downwardly from the channel to the exterior vent.

2. The side airbag of claim 1, wherein the vent is disposed in an inboard panel of the airbag.

3. The side airbag of claim 1, wherein the vent is disposed in a third chamber defined on one side by the deflector and on another side by an edge of the airbag and connected on an open end to the downstream chamber.

4. The side airbag of claim 1, wherein the deflector is sealingly connected at one end to an edge of the airbag.

5. The side airbag of claim 4, wherein a vent side of the deflector is at an angle of less than ninety degrees to the edge of the airbag.

6. The side airbag of claim 1, wherein the airbag is defined in part by a plurality of regions, with a lower region being below an armrest level, and an upper region being above the deflector, and a central region between the lower region and the upper region and the exterior vent being disposed in the central region.

7. The side airbag of claim 6, wherein the airbag comprises part of an airbag assembly, the airbag assembly further including an airbag inflator connected to the airbag in the center region at the upstream chamber.

8. The side airbag of claim 7, wherein the vent is disposed in a third chamber defined on one side by the deflector and on another side by an edge of the airbag and connected on an open end to the downstream chamber.

9. The side airbag of claim 8, wherein the vent is disposed in an inboard panel of the airbag.

10. The side airbag of claim 8, wherein the deflector is sealingly connected at one end to an edge of the airbag.

11. A side airbag for vehicles comprising:
    an inboard panel and an outboard panel sealingly joined at a seam edge at a common circumference and arranged to extend vertically in an operating position from an occupant hip region beyond an occupant upper arm region;
    a wall disposed between the inboard panel and the outboard panel forming an upstream chamber and a downstream chamber and defining an opening therebetween adjacent a lower airbag end in the operating position; and
    a deflector between a downstream side of the opening and an exterior vent, the deflector and a downstream surface of the wall defining a channel therebetween, whereby in the operating position inflation gasses exiting the opening are directed toward an upper airbag end and around an end of the deflector adjacent an outlet end of the channel before reaching the exterior vent;
    wherein the wall and the deflector cooperatively define an S-shaped gas flow path flowing downwardly in the upstream chamber to the opening, upwardly from the opening through the channel, and downwardly from the channel to the exterior vent.

12. The side airbag of claim 11, wherein the vent is disposed in the inboard panel of the airbag.

13. The side airbag of claim 11, wherein the vent is disposed in a third chamber defined on one side by the deflector and on another side by the seal and connected on an open end to the downstream chamber.

14. The side airbag of claim 11, wherein the deflector is sealingly connected at one end to the edge of the airbag.

15. The side airbag of claim 14, wherein a vent side of the deflector is at an angle of less than ninety degrees to the edge of the airbag.

16. The side airbag of claim 11, wherein the airbag is defined in part by a plurality of regions, with a lower region being below an armrest level, and an upper region being above the deflector, and a central region between the lower region and the upper region and the exterior vent being disposed in the central region.

17. The side airbag of claim 16, wherein the airbag comprises part of an airbag assembly, the airbag assembly further including an airbag inflator connected to the airbag in the center region at the upstream chamber.

18. The side airbag of claim 17, wherein the vent is disposed in a third chamber defined on one side by the deflector and on another side by the edge of the airbag and connected on an open end to the downstream chamber.

19. The side airbag of claim 18, wherein the vent is disposed in an inboard panel of the airbag.

20. The side airbag of claim 18, wherein the deflector is sealingly connected at one end to the edge of the airbag.

* * * * *